No. 749,394. PATENTED JAN. 12, 1904.
A. G. MYERS.
PLANTER.
APPLICATION FILED APR. 4, 1903.
NO MODEL. 2 SHEETS—SHEET 1.
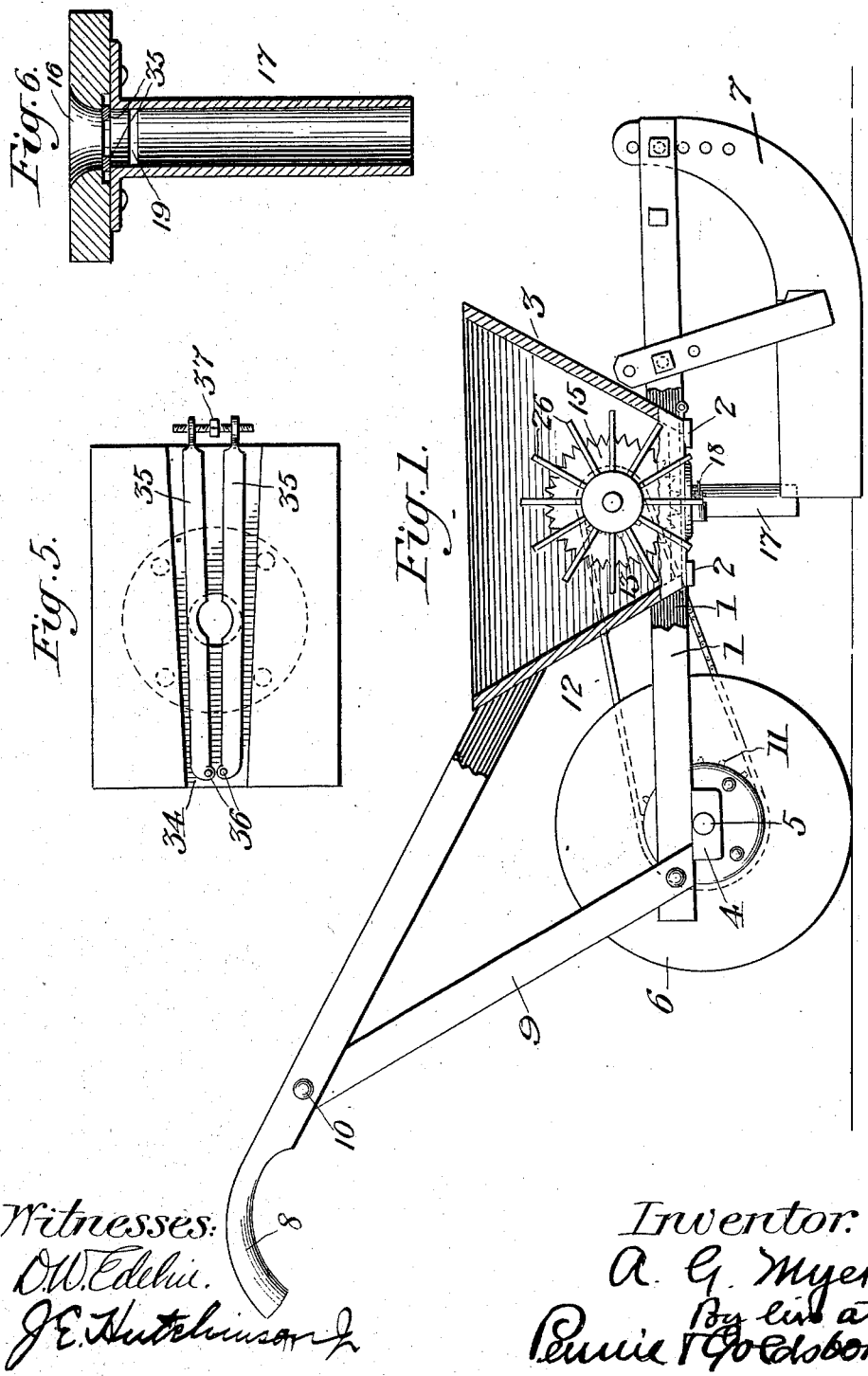
Witnesses:
O. W. Edelin.
J. E. Hutchinson Jr.
Inventor:
A. G. Myers
By his attys.
Bennie & Goldsborough

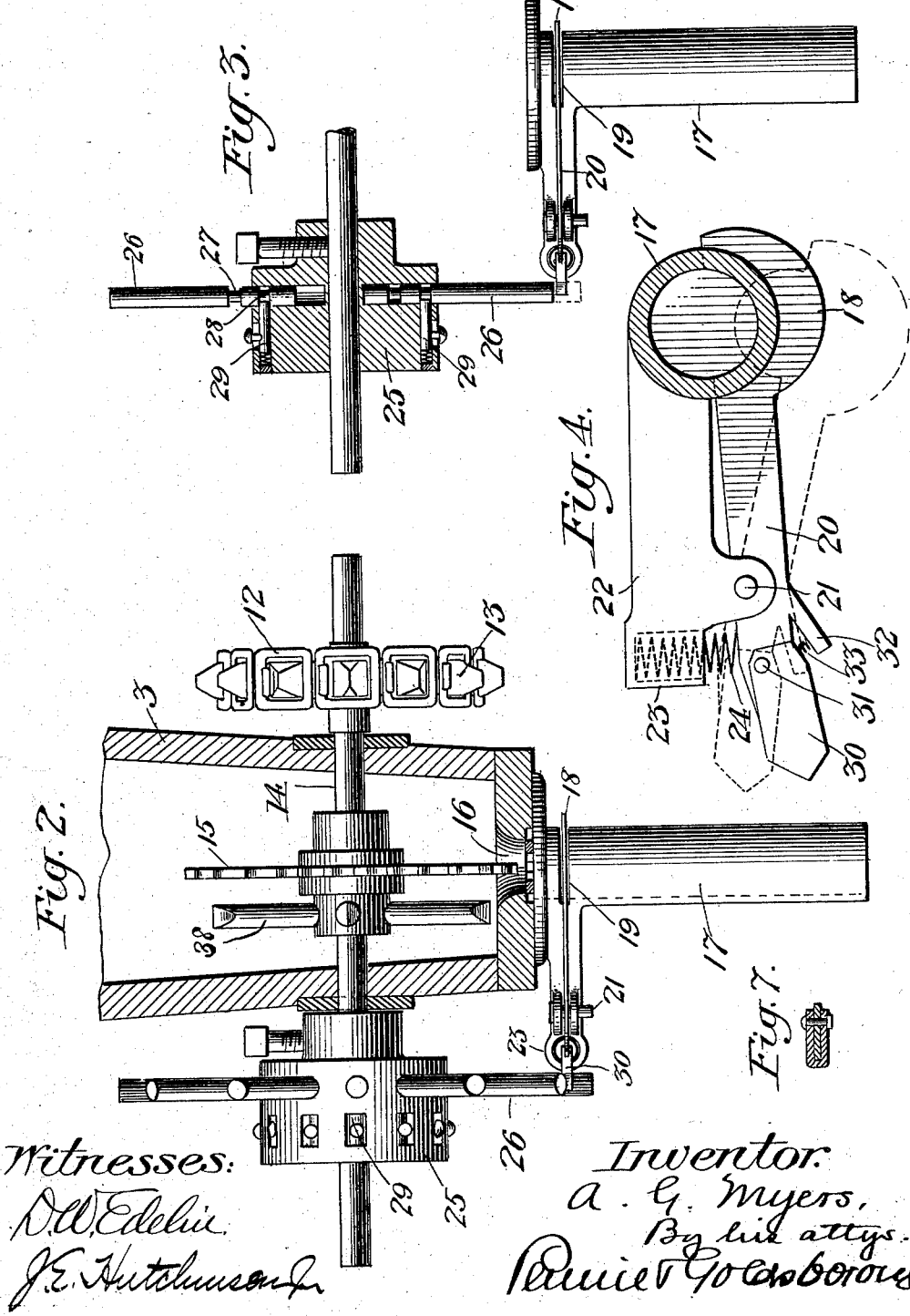

No. 749,394. Patented January 12, 1904.

UNITED STATES PATENT OFFICE.

ALBERT G. MYERS, OF CHARLOTTE, NORTH CAROLINA.

PLANTER.

SPECIFICATION forming part of Letters Patent No. 749,394, dated January 12, 1904.

Application filed April 4, 1903. Serial No. 151,117. (No model.)

*To all whom it may concern:*

Be it known that I, ALBERT G. MYERS, a citizen of the United States, residing at Charlotte, county of Mecklenburg, State of North Carolina, have invented certain new and useful Improvements in Planters; and I do hereby declare the following to be a full, clear, and exact description of the invention, such as will enable others skilled in the art to which it appertains to make and use the same.

This invention relates to improvements in seed-planters, it pertaining to and adapted more especially for planting cotton-seed and the like, and has for its object to provide simple and effective means for regulating the number of kernels or seeds to be deposited in a hill and, further, to provide adjustable means for regulating the distance between the hills planted and to produce certain other novel constructions contributing to the general utility of the planter.

To the accomplishment of the general object stated and others which will more fully appear the preferred embodiment of the invention consists in the construction and arrangement of parts to be described, illustrated in the accompanying drawings, and defined in the appended claims.

In said drawings, Figure 1 is a side elevation of a planter constructed in accordance with my invention, the seed-hopper being shown partly in section. Fig. 2 is a transverse sectional view through the seed-hopper. Fig. 3 is a detail view of the valve-actuating means and the valved discharge-spout, said actuating means shown in cross-section. Fig. 4 is a cross-sectional view through the discharge-spout, showing in full lines the cut-off valve in its closed position and in dotted lines partly opened. Fig. 5 is an inverted view of the bottom of the hopper, the discharge-spout being detached. Fig. 6 is a vertical section through the hopper-bottom and discharge-spout, and Fig. 7 is a cross-sectional view through the pivoted end piece of the valve-stem.

Referring to the numerals of reference employed to designate corresponding parts in the several views, 1 1 denote the side bars of the main frame joined by the cross-pieces 2 2, which support the seed-hopper 3. These side bars have bearings 4 at their rear ends for receiving the shaft 5, on which is mounted the ground-wheel 6, and at their forward ends carry the usual furrow-opener, as shown at 7.

8 indicates the handles by which the implement may be guided, the same being bolted to the side bars 1 1 and suitably braced by the vertical bars 9 9 and the tie-bolt 10.

The shaft 5 is provided at one end with a sprocket-wheel 11, geared by a sprocket-chain 12 to a second sprocket-wheel 13, keyed or otherwise secured upon the agitator-shaft 14, located within the hopper 3 and provided, as usual, with a toothed wheel 15, which serves to agitate the seed within the hopper to facilitate the delivery thereof through the feed-opening 16, to which reference will be made more fully hereinafter.

Secured in any suitable manner to the bottom of the hopper 3, in such position as to register with the feed-opening 16, is a discharge-spout 17, provided with a laterally-projecting bracket 22, preferably made integral therewith and to which is pivoted, as at 21, a spring-actuated cut-off valve 18, adapted to normally enter the spout through the slot 19 and cut off the passage of seed therethrough. The spring-valve 24 is preferably seated within a socket or recess 23 in the outer end of the bracket 22 and bears against the end of the valve-stem 20, thus holding the valve in a closed position until the desired number of seeds for each hill have been fed through the opening 16, when it is opened by suitable actuating means, to be described hereinafter, and the whole number dropped in the usual way.

The valve-actuating means referred to is preferably keyed or otherwise secured to the agitator-shaft 14 upon the outside of the hopper 3, the same comprising a hub 25 and a series of radially-projecting arms 26, which fit within peripheral recesses formed in the hub, each arm being provided with two circumferential grooves 27 and 28, into either of which is adapted to project a spring-bolt 29, carried by the hub. Pivoted to the free end of the valve-stem, as at 31, is an end piece 30, preferably in the form of a spring-pressed yoke or shield, which is adapted to be engaged by the arms 26 to move the valve-stem when the arms revolve in one direction and to give or yield when said arms move in the reverse direction, so that when the implement is running forward the actuating-arms in turn operate the valve to discharge the seed through the spout; but by reason of any retrograde movement of the arms the pivoted end piece will yield sufficiently to allow said arms to pass. This pivoted end piece is normally held in the position shown in Fig. 4 by means of a spring 33, which is seated against a short arm 32, rigidly attached to the valve-stem, said spring bearing against the said pivoted end piece and holding the same in this position until struck by the actuating-arms during retrograde movement, as above described.

It will be readily understood from the foregoing description that when the arms 26 are pulled out, so that the spring-bolt 29 will engage the groove 28, the arms will be in a position to strike the pivoted end piece, and thus open the valve; but when adjusted to a position to allow the spring-bolt to engage the groove 27 the arms will be shortened sufficiently to pass said pivoted end piece without striking it. Thus it will be seen that the distance between the hills planted may be varied as desired. For instance, if it be desired to drop the seeds, say, two feet apart only every other arm need be set to strike the pivoted end piece of the valve-stem, whereas when it is desired to plant the seeds every twelve inches apart each arm in the hub is brought into position to engage the said pivoted end piece.

An adjustable regulating-gate for the hopper is provided for regulating the number of seeds to be planted in a hill, the same comprising two plates 35 35, each pivoted at one end, as at 36, to the bottom of the hopper and connected at their free ends by a double screw 37, by means of which the plates may be moved laterally toward or from each other to contract or enlarge the feed-opening 16, said plates projecting a sufficient distance from under the bottom of the hopper to allow for the convenient adjustment of the same. It will be noted that the hopper-bottom is suitably recessed, as at 34, for receiving the regulating-plates, said recess being of a depth substantially the thickness of the plates and of such a width as to allow for the lateral adjustment thereof, as above described.

It is very common in all cotton-planters for the seeds to bank along the sides of the hopper, and I therefore provide an additional agitating device, as shown at 38, which is mounted on the shaft 14 to one side of the toothed wheel 15 and agitates and feeds the seed to a position to be engaged by the toothed wheel, where they are fed through the opening 16 and discharged, as hereinbefore described.

It is apparent that in carrying out my invention some changes from the combinations herein shown and described may be made, and I would therefore have it understood that I do not limit myself to the precise details herein shown, but hold myself at liberty to make such changes and alterations as fairly fall within the spirit and scope of my invention.

Having thus described my invention, what I claim is—

1. In a planter, the combination of a hopper having a discharge-spout, a valve adapted to normally cut off the passage of seed through the spout, the free end of the stem of the valve having a pivoted end piece which is rigid with the stem in one direction and adapted to yield in the other direction, and a valve-actuating device operated from the main axle of the machine.

2. In a planter, the combination of a hopper, having a discharge-spout, a pivoted spring-actuated valve adapted to normally cut off the passage of seed through the spout, the free end of the stem of the valve having a pivoted end piece which is rigid with the stem in one direction and adapted to yield in the other direction, and a valve-actuating device comprising a hub and a series of radial arms secured to the hub.

3. In a planter, the combination of a hopper, a shaft therein carrying a feed-wheel, a hub on the shaft outside the hopper and a series of radial arms adjustably secured to the hub, a discharge-spout leading from the hopper, a pivoted valve adapted to cut off the flow of seed through the spout, and a spring-pressed end piece pivoted to the free end of the valve-stem and adapted to be engaged by the arms on the hub, the said end piece adapted to move the stem when the arms revolve in one direction and to yield when the arms move in the reverse direction.

4. In a planter, the combination of a hopper, a shaft driven from the main axle of the machine, a hub on the shaft, said hub being provided with a series of peripheral recesses, arms fitting within said recesses, each arm being provided with circumferential grooves, bolts carried by the hub and adapted to engage either of the grooves in said arms, a discharge-opening, and a cut-off valve adapted to be actuated by the arms on the hub.

5. In a planter, the combination of a hopper, a shaft passing therethrough, a feed-wheel on the shaft within the hopper, a hub on the shaft outside the hopper, said hub being provided with a series of peripheral recesses, arms fitting within said recesses, each arm being provided with circumferential grooves, spring-bolts carried by the hub and adapted to engage either of the grooves in said arms, a discharge-spout, and a cut-off valve adapted to be actuated by the arms on the hub.

In testimony whereof I affix my signature in presence of two witnesses.

ALBERT G. MYERS.

Witnesses:
S. B. ALEXANDER,
D. G. MAXWELL.